W. B. HARSEL.
STITCHING DEVICE.
APPLICATION FILED FEB. 11, 1918. RENEWED FEB. 3, 1922.
1,426,867. Patented Aug. 22, 1922.
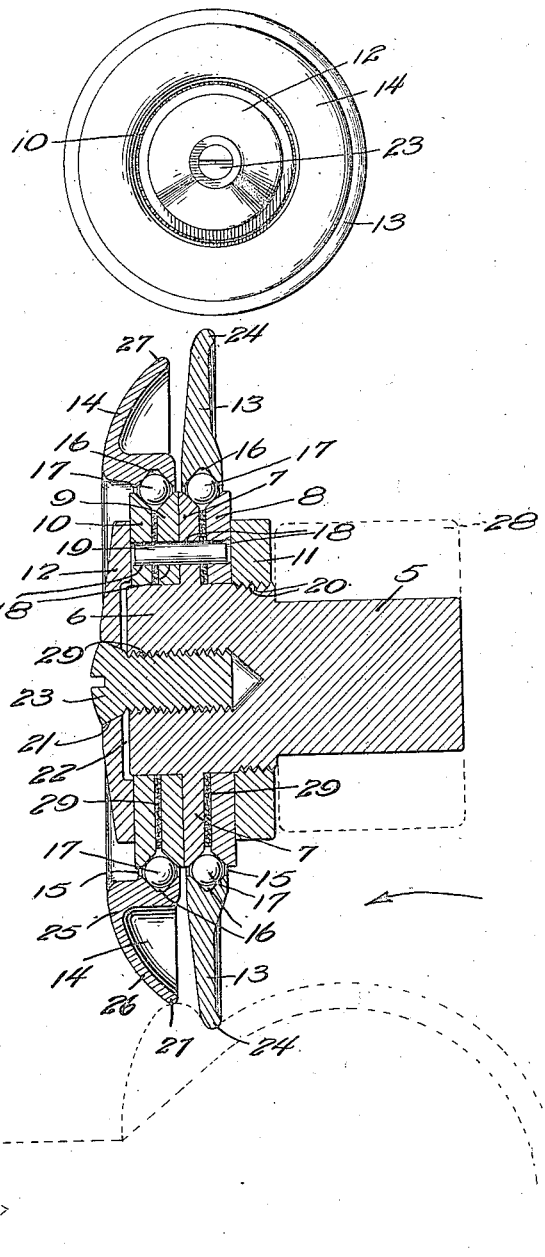
Inventor
William B. Harsel.

UNITED STATES PATENT OFFICE.

WILLIAM B. HARSEL, OF AKRON, OHIO, ASSIGNOR TO THE GOODYEAR TIRE & RUBBER COMPANY, OF AKRON, OHIO, A CORPORATION OF OHIO.

STITCHING DEVICE.

1,426,867.                    Specification of Letters Patent.    Patented Aug. 22, 1922.

Application filed February 11, 1918, Serial No. 216,531. Renewed February 3, 1922. Serial No. 533,979.

*To all whom it may concern:*

Be it known that I, WILLIAM B. HARSEL, a citizen of the United States, residing at Akron, in the county of Summit and State of Ohio, have invented new and useful Improvements in Stitching Devices, of which the following is a specification.

My present invention relates to stitching devices for laying down the fabric plies, during the building up of a pneumatic tire carcass, and has particular reference to improvements in the construction of the type of stitchers disclosed in my pending application Serial No. 147,178.

One of the principal objects of my present invention is to so mount the discs forming the stitcher unit that each disc is able to rotate freely of the other disc.

Another object is the provision of means whereby the space existent between the discs may be varied at will, within reasonable limits, to adapt the stitcher to use in connection with tires built of different weight fabric and different sized or shaped beads.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawing, wherein there has been illustrated a preferred embodiment of the invention as it is reduced to practice, similar reference numbers designate corresponding parts:

Fig. 1 is a vertical section view of my improved stitcher; and

Fig. 2 is a front elevation of same.

The preferred form of stitching device contemplated herein includes a shank or arm 5 having an enlarged end portion 6, which forms a hub about which the stitching discs revolve, and is provided, (preferably at its approximate center), with a fixed bearing annulus 7; a series of removable bearing annuli 8, 9 and 10, mounted on the hub 6; a pair of removable clamping discs 11 and 12, which are adapted to maintain the bearing annuli in proper assembled relation; and a pair of stitching discs 13 and 14 which are supported for revolution about the hub through the agency of an annular series of ball bearings 17.

Each of the stitching discs 13 and 14 has a large central opening 15 and a ball bearing raceway 16 formed in the edge thereof and arranged to receive the bearings 17. These balls 17 are also supported in raceways complementally formed by the pairs of bearing annuli 7, 8, 9 and 10 respectively. Spacing discs or washers 29 are also provided between the bearing annuli 7, 8, 9 and 10. The bearing annuli are provided with a registering aperture 18 through which a locking pin 19 is inserted to hold the bearing discs against rotation.

The inner clamping plate 11 has a central screw threaded aperture 20, arranged to be screwed into position upon a thread formed on the inner shoulder of the head 6. The outer clamping plate 12 consists of a circular disc somewhat conical in shape on its outer surface but flat on its inner surface and provided with a small beveled central aperture 21 and a channeled out portion 22. The outer end of the head portion 6 is formed with a central screw-threaded cavity for the accommodation of a screw 23 arranged to retain the clamping plate 12 in tight position against the bearing annuli 9 and 10 as will be understood.

The stitching discs 13 and 14 are preferably of slightly different diameters as in my pending application previously referred to. The disc 13 is provided with a circumferential bead edge 24, while the smaller disc 14 is shaped to form an offset portion, adjacent to the raceway 16, from which a concaved flange extends backwards terminating in a rounded edge 27. The larger disc of the two, laterally follows the smaller disc around the cross-sectional periphery of the tire carcass, in the direction indicated by the arrow, as the two proceed along the tire circumference side by side in an ever-narrowing spiral. This larger disc is adapted to contact with the outer portion of the annular bead ridge when the stitcher roll is straddling the lateral apex line of the bead, the parts being then in the position chosen for illustration.

It is to be understood that the shank 5 of the stitcher roll may be mounted upon any supporting means 28 and that its movement about the cross-sectional periphery of the carcass may be controlled manually or in any mechanical manner which suggests itself as being desirable.

As will be apparent, any wear, either on the balls themselves or on the surfaces of the raceways in the bearing discs, may be readily taken up by inserting between either pair of bearing discs a thinner washer than the one previously employed.

It also is to be noted that the space between the stitcher discs 13 and 14 may be adjusted by inserting a washer of proper thickness between the fixed bearing disc 7 and the adjacent removable bearing disc 9. Thus the stitcher may be adjusted to adapt it to tires of different sizes and to beads of different sizes and varying contours.

In concluding the description of my invention, I desire to direct particular attention to the fact that the two discs 13 and 14 are mounted in a manner to permit each rotating freely of the other. As a result, the two discs may freely pass around the base portion of the tire at different peripheral speeds without either effecting in any way the operation of the other.

What I claim is:

1. A compound stitcher of the character described, including a hub, a pair of complemental bearing discs mounted thereon to form an annular ball bearing raceway in their periphery, means for holding the discs against accidental separation but permitting separation or approachment of the discs for adjustment purposes, a stitcher disc and a series of ball bearings seated in the said raceway and supporting the stitcher disc for rotation about the bearing discs.

2. A compound stitcher of the character described, including a hub, pairs of complemental bearing discs mounted thereon, each pair of bearing discs complementally defining an annular raceway, a series of ball bearings contained in each raceway, a pair of stitcher discs each having an internal ball bearing raceway, each disc of said pair of stitcher discs being mounted to receive a series of balls contained in one of the first mentioned raceways, and means for maintaining the bearing discs in assembled relation.

3. A compound stitcher of the character described, including a hub, pairs of complemental bearing discs mounted thereon, each pair of bearing discs complementally defining an annular raceway, a series of ball bearings contained in each raceway, a pair of stitcher discs each having an internal ball bearing raceway, each disc of said pair of stitcher discs being mounted to receive a series of balls contained in one of the first mentioned raceways, and means for maintaining the bearing discs in assembled relation, said means being adjustable to permit the introduction between the discs of each pair, or between the pairs of discs, of washers or equivalent spacing elements for the purpose of varying either the cross-sectional dimension of the first mentioned ball bearing raceways, or varying the space included between the pairs of bearing discs and hence between the stitcher discs.

4. A compound stitcher of the character described, including a hub, a pair of stitchers, and spaced independent bearings supporting the stitchers for rotation about the hub.

5. A compound stitcher of the character described, including a hub, an annular bearing disc formed integrally therewith, three removable bearing discs mounted on the hub, two of said removable discs mating to form an annular raceway for a series of anti-friction bearings and the other of said removable bearing discs being arranged to mate with the integral bearing disc to form a second annular raceway for a second series of anti-friction bearings, means to hold all of said bearing discs against relative rotation to each other and to the hub, means holding said discs in assembled mating relation, a series of anti-friction bearings contained in each of the aforesaid raceways, and a pair of stitcher discs mounted for rotation about the hub, one of which is supported on one series of bearings and the other of which is supported on the other series of bearings.

In testimony whereof, I have signed my name in the presence of two subscribing witnesses.

WILLIAM B. HARSEL.

Witnesses:
B. J. McDanel,
R. S. Trogner.